Figure 1:
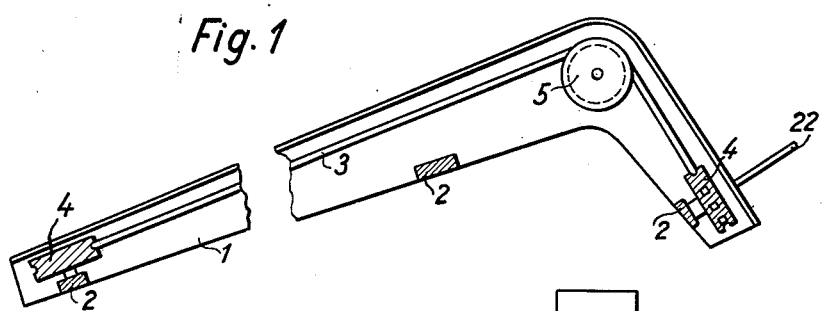

Nov. 25, 1952     H. H. M. BUSCH-JENSEN     2,619,220
CONVEYER FOR BAR MATERIAL

Filed July 25, 1947

Inventor

HARALD HUGO MALLY BUSCH-JENSEN

By Haseltine, Lake & Co.
Agents

Patented Nov. 25, 1952

2,619,220

UNITED STATES PATENT OFFICE 2,619,220

CONVEYER FOR BAR MATERIAL

Harald Hugo Mally Busch-Jensen,
Copenhagen, Denmark

Application July 25, 1947, Serial No. 763,609
In Denmark July 11, 1941

Section 1, Public Law 690, August 8, 1946
Patent expires July 11, 1961

7 Claims. (Cl. 198—179)

The present invention relates to a conveyer for bar-material. For the conveyance of such material, for instance for drawing up finished galvanized tubes from the galvanizing bath, manual power was hitherto used, or rotating rollers between which the tubes were inserted to be drawn up from the bath and pushed on to a slide or the like. The drawing up by hand is, however, a rather tedious and therefore expensive process, and the roller device entails the disadvantage that the tubes can only be conveyed over a distance corresponding to their own length if only a single roller device is available, as is normally the case.

It is also previously known to secure the tubes to a carriage movable on rails and then, for instance by means of a chain, to pull the carriage to the place where the tubes are to be delivered. When conveyers of this type are used the carriage must be disengaged from the chain at the place of delivery, and after discharge of the tubes returned to the starting place either by hand or by gravity along an inclined surface, all of which requires not only special handling but also special operators, and takes a long time. Furthermore, in the known conveyers of this type it has been necessary to secure the tubes to the carriage and again remove them therefrom by hand, and this further complicates the operation.

The above disadvantages are overcome by means of the conveyer according to the invention which is of the type comprising one or more carriages reciprocating on a track and drawn by a chain and having the material secured thereto during the transport. The conveyer according to the invention is characterized by means for fastening the material to the carriage such as a gripping device mounted thereon and adapted to close automatically, the said gripping device being in a manner known per se adapted to automatically release the conveyed material.

Thus, by means of the invention a very simple conveyer is provided requiring only a very slight operation. For the operation of the conveyer according to the invention it is only necessary, by hand or in any other manner, to place the tubes or like bar-materials in the gripping device of the carriage, whereupon, by means of any suitable chain drive, the carriage is moved to the place of delivery, where the material is automatically released from the gripping device, and the carriage is then returned to the starting place.

According to the invention the gripping device preferably consists of a pair of jaws one part of which is fixed and formed by a cross-bar mounted approximately at right angles to the longitudinal axis of the track, whereas the other part is movable and composed of one or more plates according to the application of the conveyer exclusively for the conveyance of uniform or not uniform material, in the first case only a broad plate being needed, and in the latter case, for the conveyance of different materials, preferably a number of juxtaposed narrower plates being used. The plate or plates are pivotably mounted on a shaft extending parallel with and above the cross-bar, and they may be forced towards the cross-bar, for instance by action of a spring. When the bar-material is to be inserted into the gripping device, it is therefore only necessary to push it in between the cross-bar and the plate, the latter being forced back against the tension of the spring to abut against the upper surface of the material, and the material will then be retained by the clamping effect exerted by the cross-bar and the plate during an outward movement of the material. According to the invention the automatic release at the place of delivery may be obtained by means of a lever connected with the plate, which lever during the movement of the carriage abuts against a stop at the place where the conveyed material is to be delivered, so that the plate is raised by being swung away from the bar-material by means of the said stop.

Figure 2:
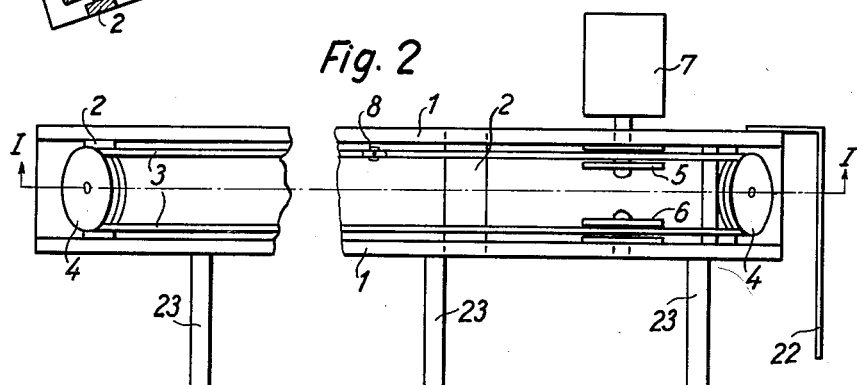
Figure 3:
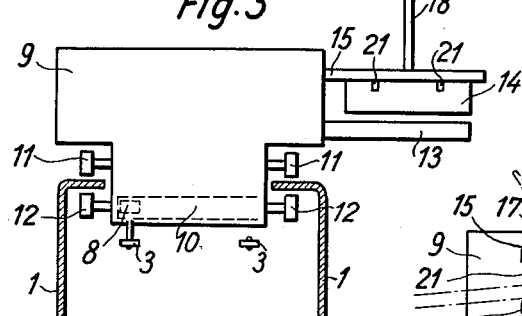
Figure 4:
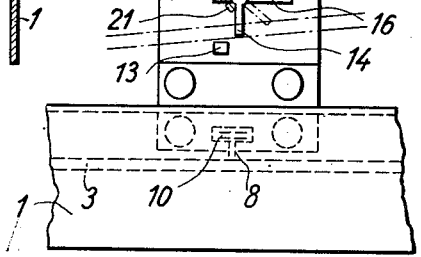

The invention will now be described in greater detail with reference to the accompanying drawing illustrating a form of execution of a conveyor according to the invention, and in which:

Fig. 1 is a sectional view of a conveyer according to the invention along the line I—I in Fig. 2, Fig. 2 a plan view of the conveyer, Fig. 3 a front view of a transport carriage, and Fig. 4 an elevational view of the transport carriage and a portion of the transport track.

The conveyer shown in the drawing is particularly adapted to draw galvanized tubes up from a galvanizing bath, and the transport track is therefore inclined, as shown in Figs. 1 and 2, so as to facilitate the drawing up of the tubes and enabling the floating metal to pour out from the inside of the tubes. Besides, the conveyer is of the type having a single transport carriage reciprocating along a track, but the invention is not limited to conveyers of this type as it may be used also in connection with conveyers having one or more carriages and two tracks connected at the ends but otherwise mutually independent with respect to the direction of motion.

The track shown in the drawing consists of two rails 1 suitably supported and interconnected for instance by means of cross-bars 2.

The first and longest part of the track is upwardly inclined and the last part downwardly inclined. Between the rails an endless chain 3 can be driven in a constant direction. At the ends of the track the chain 3 is carried over guide roller 4 rotatably mounted in the cross-bars 2 and pivotable in a plane parallel with the upper surface of the rails. Furthermore, at the curved top of the track the chain 3 is carried over two sprocket wheels 5 and 6 rotatably mounted in the rails 1 and situated in planes at right angles to the upper surface of the rails. One of the sprocket wheels (5) may be constantly rotated by means of a driving device 7, such as for instance an electromotor provided with a gearing, a transmission or the like. Thus the chain 3 is driven parallel with the upper surface of the rails 1.

To one of the links of the chain 3 an upwardly extending pin 8 is secured provided with a head the cross-section of which has the form of a T. By means of this pin 8 a carriage 9 reciprocating on the rails 1, Figs. 3 and 4, is connected with the chain 3 the head of the pin 8 entering a T-shaped recess or slot 10 provided in the lower portion of the carriage and extending transversely of the direction of motion a length at least equal to the distance between the two oppositely moving parts of the chain 3.

The said connection between the chain 3 and the carriage has the effect that the carriage, when the chain is in motion, may be reciprocated by the chain, without it being necessary to change the connection between the chain and the carriage as the pin 8 slides from one end of the slot 10 to the other at the ends of the track.

The carriage is supported along the rails by means of four wheels 11 rotatably mounted on the lower portion of the carriage, two on each side thereof. To prevent the carriage from turning over or tipping in consequence of a one-sided load the carriage has also wheels 12 engaging the lower surface of the rails 1.

The tubes or like bar-materials to be conveyed are secured to the carriage by means of a gripping device mounted thereon and comprising a cross-bar 13, Figs. 3 and 4, extending at right angles to the direction of motion of the carriage 9, and one or more jaw plates 14 that can be turned downward towards the cross-bar. Above the cross-bar 13 an arm 15 is provided having projections 16 extending in the direction of motion of the conveyed materials and carrying a shaft 17 on which the plate 14 is pivotably mounted.

The plate 14 carries an upwardly extending lever 18 connected with one end of a spring 19 the other end of which is connected with a rod 20 secured between the projections 16. This spring 19 will tend to swing the plate 14 towards the cross-bar 13, but during this movement the plate 14 will abut against a stop 21 provided on the arm 15, the lower edge of the plate 14 being in this position near the cross-bar 13.

The bar-material to be inserted into the gripping device is pushed in between the cross-bar 13 and the arm 15 by hand or in any other way from the front side thereby swinging the plate 14 rearwardly against the action of the spring 19, so that the plate 14, as shown in dotted lines in Fig. 4, will engage the upper surface of the material and clamp the same against the cross-bar 13. The clamping effect attained thereby will be further increased by the tendency of the material to withdraw from the gripping device after the carriage has been started.

At the place of delivery of the conveyed goods, or rather at the place where the conveyed goods should be released from the gripping device 13, 14 a stop 22 is provided extending into the path of the lever 18. Thus, when the carriage 9 comes to this place the stop 22 will swing the lever 18 counter-clockwise, Fig. 4, and thereby swing the plate 14 into a position in which the conveyed goods are released from the gripping device and can be removed from the carriage if they do not fall out by themselves.

To support the conveyed goods during the conveyance brackets 23, over which the goods may slide, are provided laterally of the rail 1 at the side where the gripping device is provided.

I claim:

1. In a conveyer for bar material, the combination with a track of at least one carriage reciprocating on the track between loading and delivery stations, an endless conveyor having two strands travelling in opposite directions between the ends of the track, a pin projecting from the conveyor, the carriage having a transverse slot embracing the pin and extending between the strands of the conveyor, a gripping device mounted on said carriage and having a cross-bar projecting from the carriage and the track, a plate pivotally mounted on a shaft extending parallel with the cross-bar, and means for forcing the said plate in the direction of the cross-bar.

2. In a conveyer for bar material, the combination with a track of at least one carriage reciprocating on the track, an endless conveyor having two strands travelling in opposite directions between the ends of the track, a pin projecting from the conveyor, the carriage having a transverse slot embracing the pin and extending between the strands of the conveyor, a releasable gripping device mounted on said carriage and having a cross-bar projecting from the carriage and the track, a plate pivotally mounted on a shaft extending parallel to the cross-bar, means for forcing the said plate in the direction of said cross-bar, a lever connected to said plate, and a stop mounted on the track in the path of said lever at the place where the gripping device is to be released.

3. In a conveyer for bar material, the combination with a track of at least one carriage having mounted thereon a gripping device for the bar material, said carriage being reciprocated on the track between a loading station and a delivery station, the track being first upwardly and then downwardly inclined, an endless conveyor having two strands travelling in opposite directions between the ends of the track, a pin projecting from the conveyor, the carriage having a transverse slot embracing the pin and extending between the strands of the conveyor.

4. In a conveyer for bar material, the combination with a track of at least one carriage having mounted thereon a releasable gripping device for the bar material, said carriage being reciprocated on the track between a loading station and a delivery station where the gripping device is released, the track being first upwardly and then downwardly inclined, an endless conveyor having two strands travelling in opposite directions between the ends of the track, a pin projecting from the conveyor, the carriage having a transverse slot embracing the pin and extending between the strands of the conveyor, and a plurality of arms lying in the same plane and extending laterally of the track to support the bar material when the latter is pulled along the track.

5. In a conveyer for bar material, the combination with a track of at least one carriage reciprocated on the track between a loading station and a delivery station, the track being first upwardly and then downwardly inclined, an endless conveyor having two strands travelling in opposite directions between the ends of the track, a pin projecting from the conveyor, the carriage having a transverse slot embracing the pin and extending between the strands of the conveyor, a gripping device mounted on the carriage and having a cross-bar projecting from the carriage, a plate pivotally mounted on a shaft extending parallel to the cross-bar, means for forcing the plate in the direction of said cross-bar, a lever connected to said plate, a plurality of arms lying in the same plane and extending laterally of the track to support the bar material when pulled along the track, and a stop adjacent said track extending into the path of said lever.

6. In a conveyer for bar material, the combination with a track of a carriage reciprocated on a path of the track, an endless conveyor having two strands travelling in opposite directions between the ends of the track, a pin projecting from the conveyor, the carriage having a transverse slot embracing the pin and extending between the strands of the conveyor, a gripping device mounted on said carriage, said gripping device having a cross-bar projecting from the carriage and the track, a plate pivotally mounted on a shaft extending parallel to the cross-bar, and means for forcing said plate in the direction of said cross-bar.

7. In a conveyer for bar material, the combination with a track of at least one carriage advanced on one portion of the track from one end thereof to the other and returned on another portion of the track, an endless conveyor having two strands travelling in opposite directions between the ends of the track, a pin projecting from the conveyor, the carriage having a transverse slot embracing the pin and extending between the strands of the conveyor, a gripping device mounted on said carriage and having a cross-bar projecting from the carriage, and a plate pivotally mounted on a shaft extending parallel to and above said cross-bar.

HARALD HUGO MALLY BUSCH-JENSEN.

REFERENCES CITED

The following references are of record in the file of this patent:

UNITED STATES PATENTS

| Number | Name | Date |
|---|---|---|
| 985,398 | Cook | Feb. 28, 1911 |
| 1,019,086 | Quinn | Mar. 5, 1912 |
| 1,025,853 | Bartholomew | May 7, 1912 |
| 1,451,879 | Lacke | Apr. 17, 1923 |
| 1,506,974 | Cooley | Sept. 2, 1924 |
| 1,556,819 | Hires | Oct. 13, 1925 |
| 1,645,600 | Kohler | Oct. 18, 1927 |